Aug. 19, 1969  K. R. LEWIS  3,461,731
MECHANISM FOR CONVERTING ROTARY MOTION TO RECIPROCATING
AND ROTARY MOTION
Original Filed Dec. 16, 1966  6 Sheets-Sheet 1
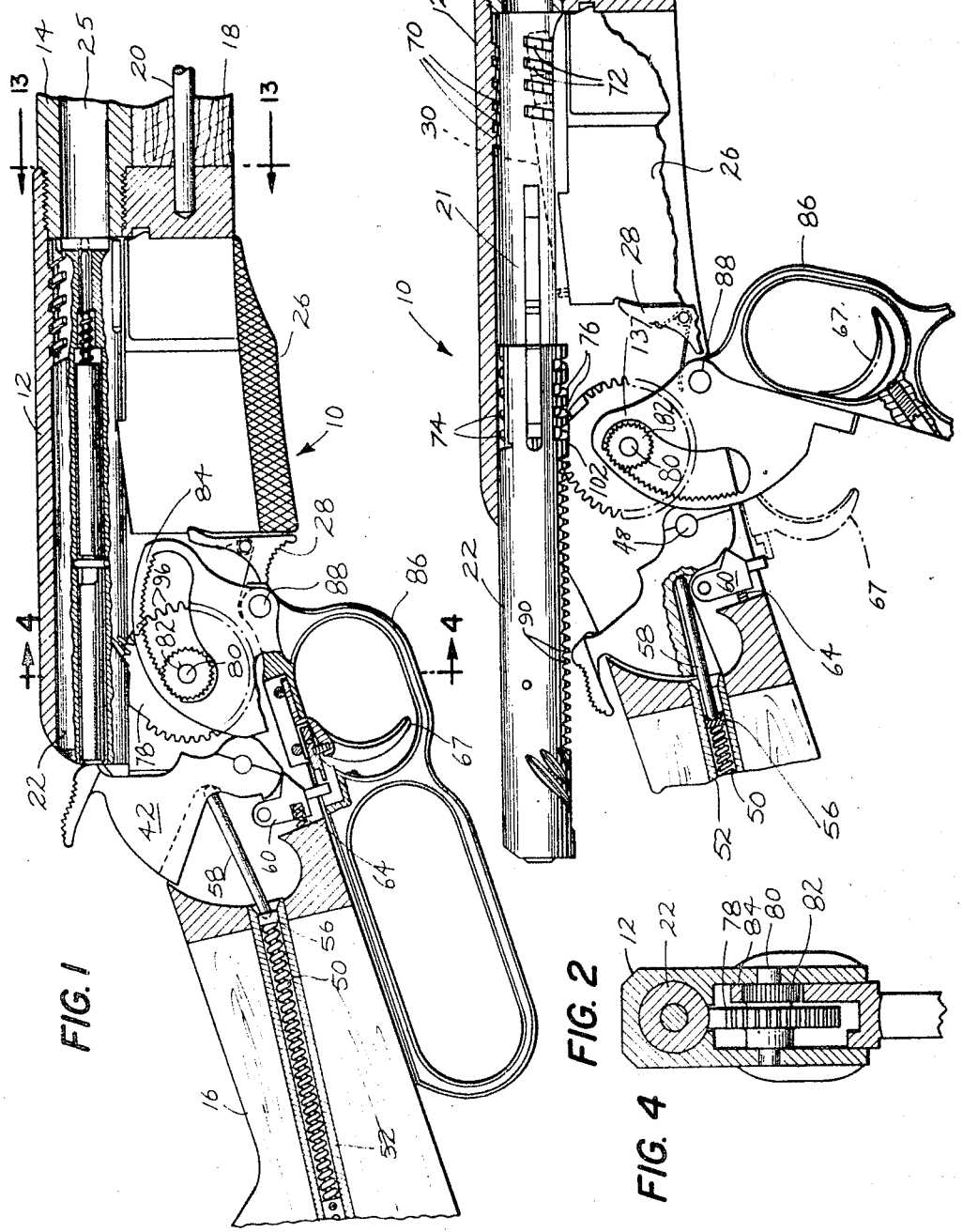
INVENTOR.
KARL R. LEWIS
BY
McCormick, Paulding & Huber
ATTORNEYS

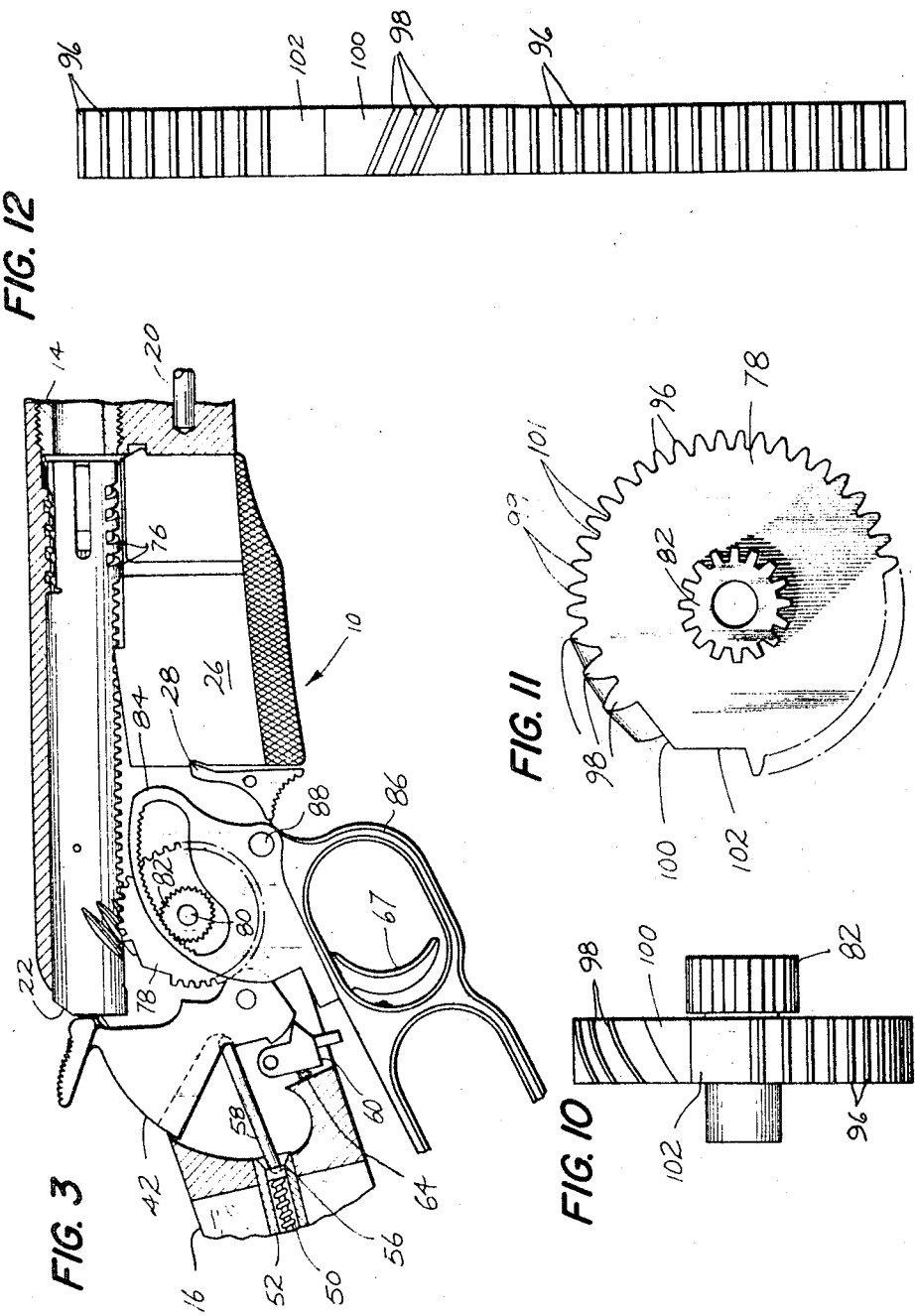

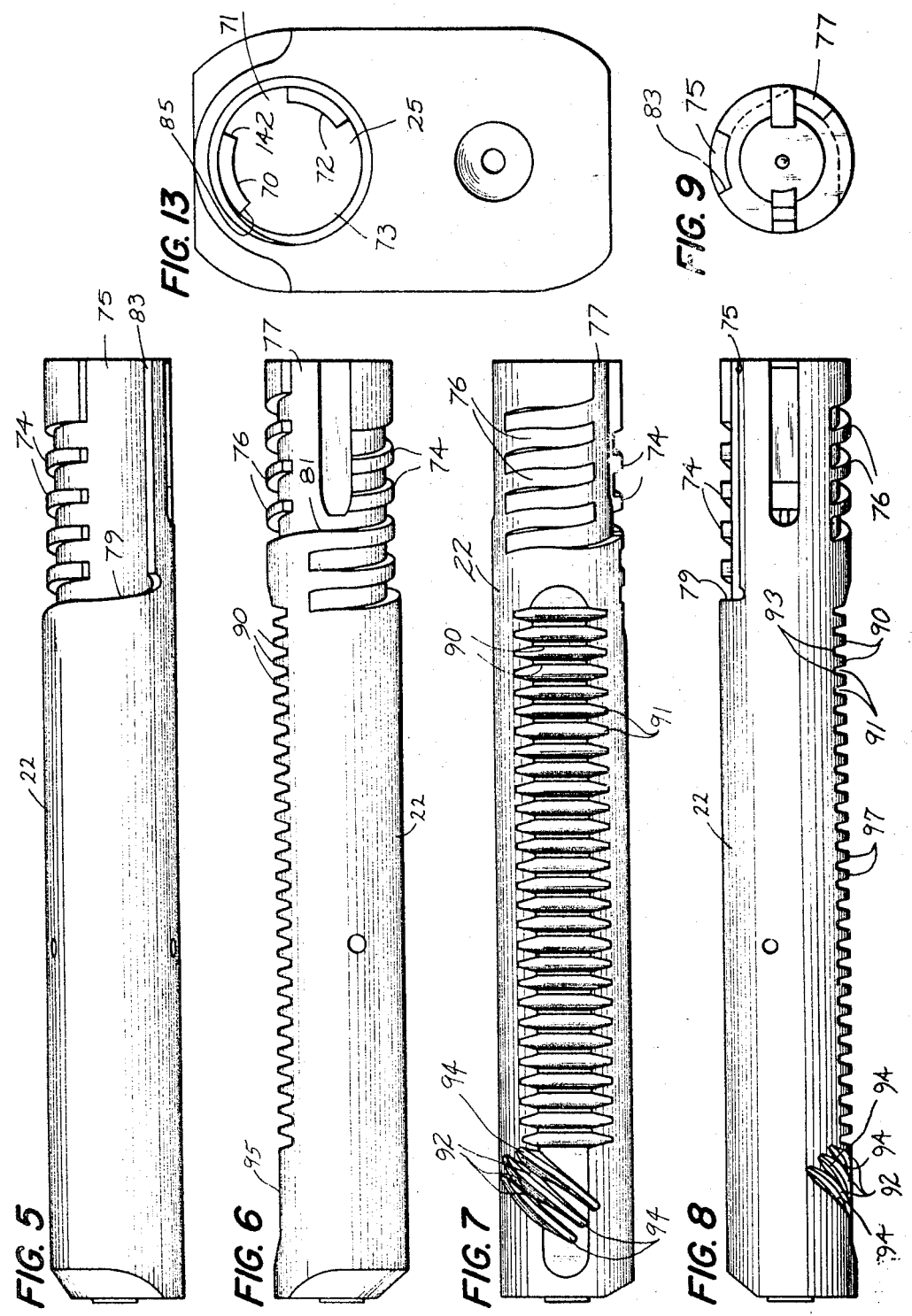

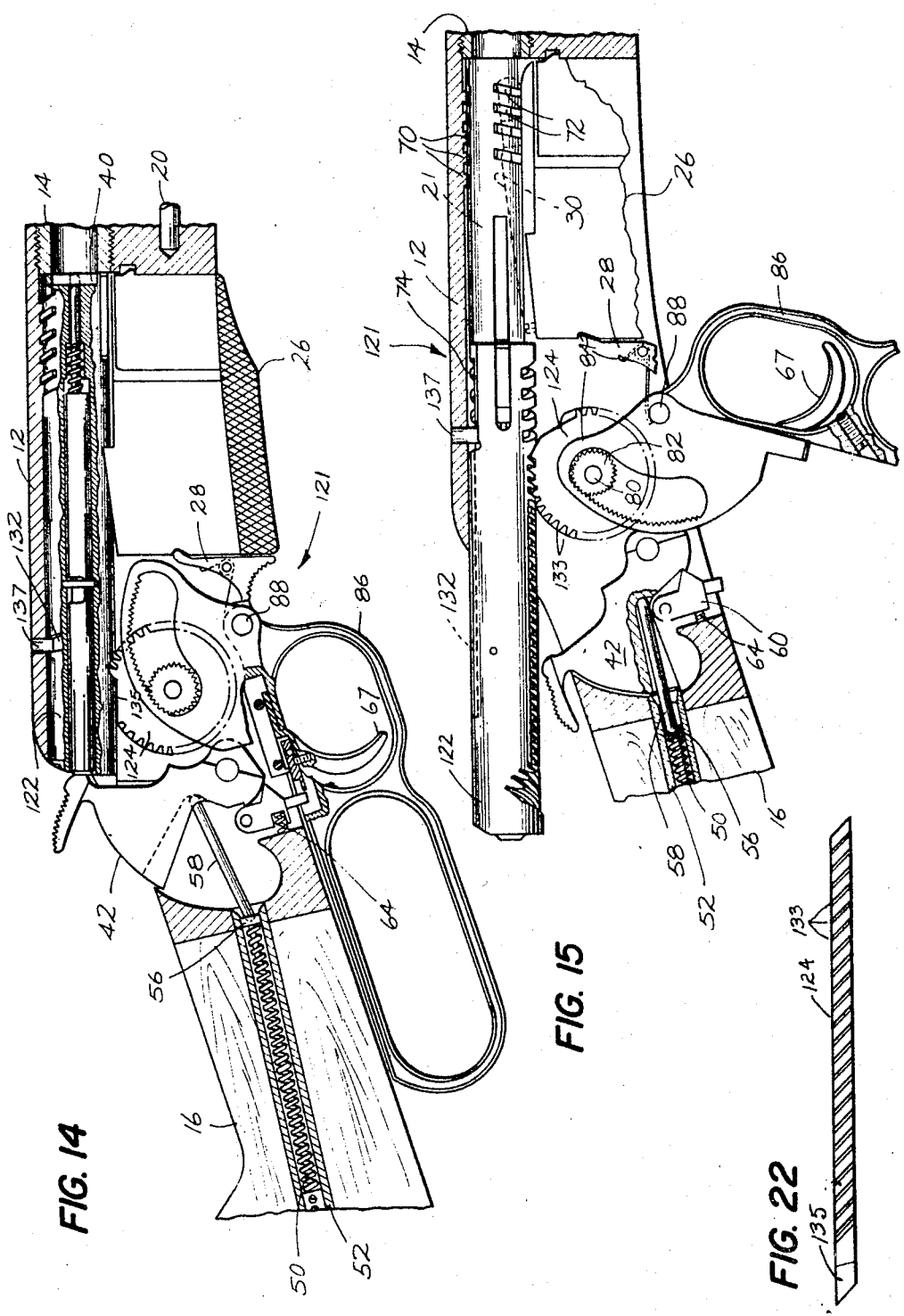

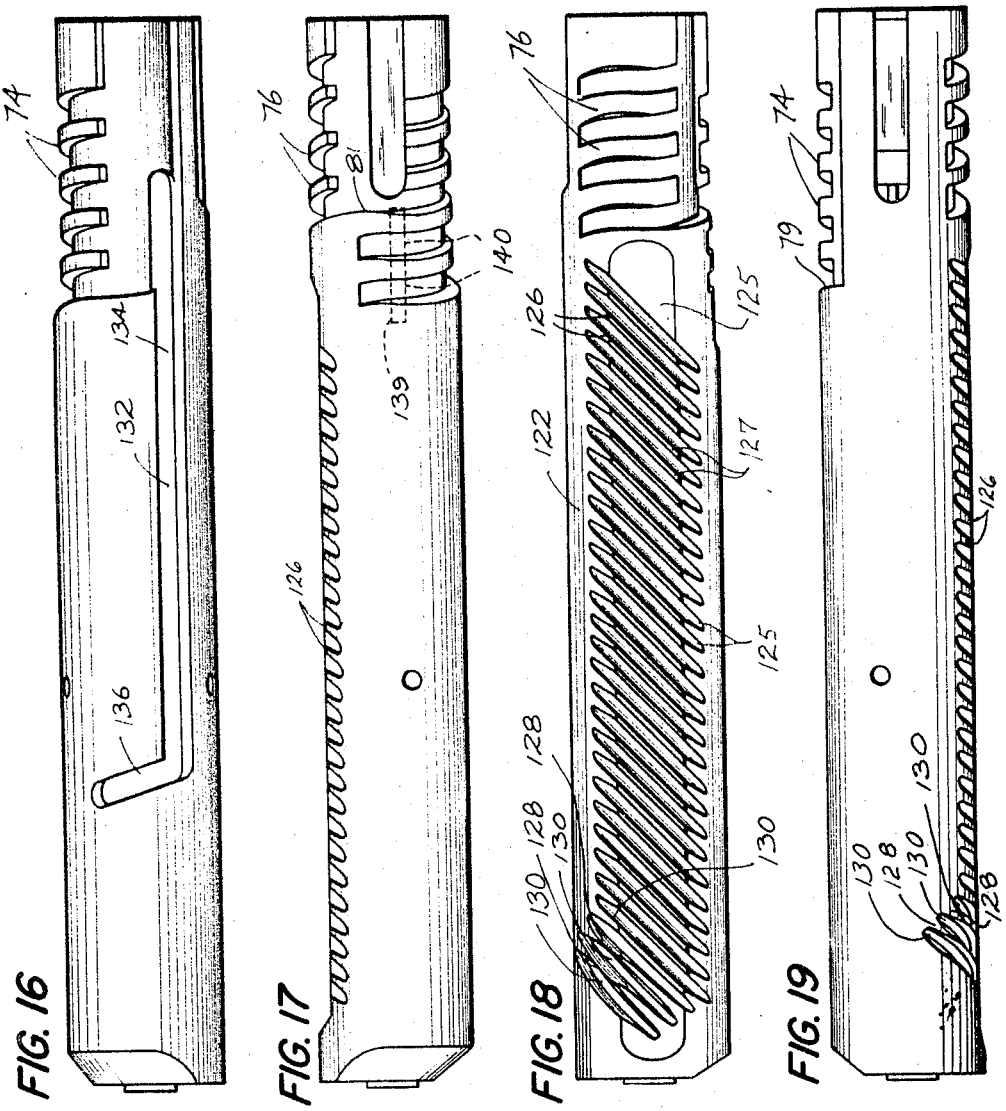

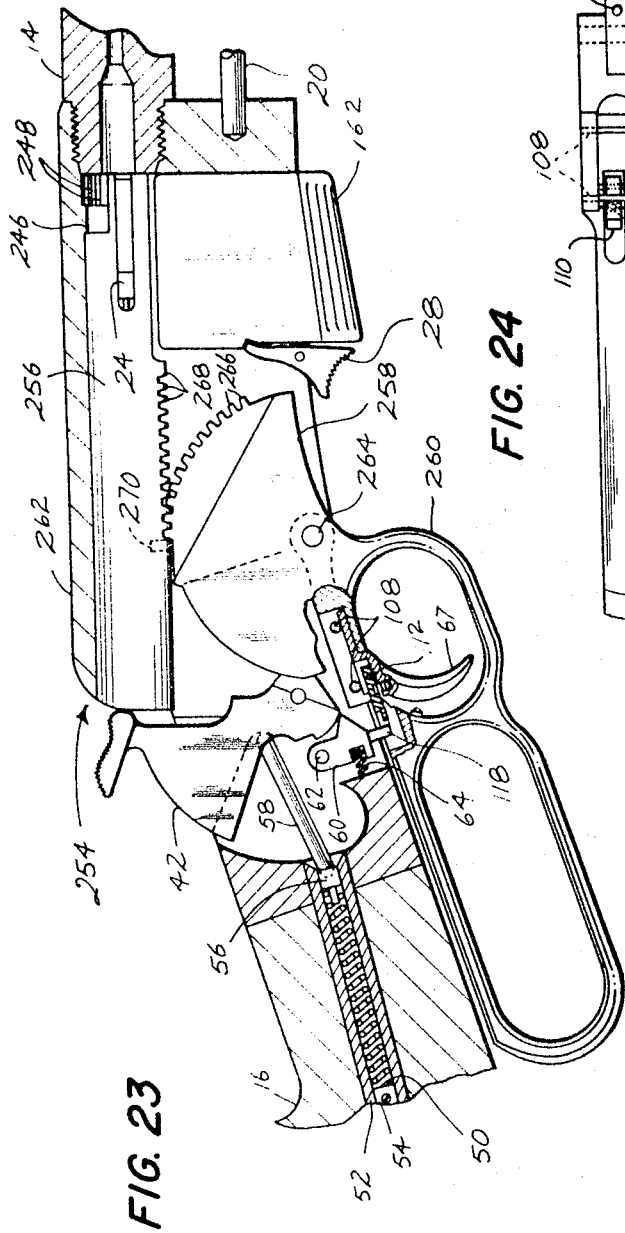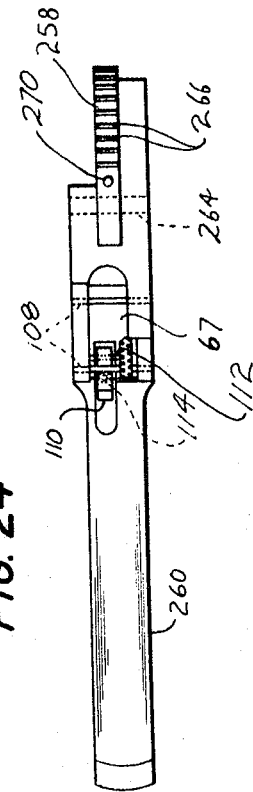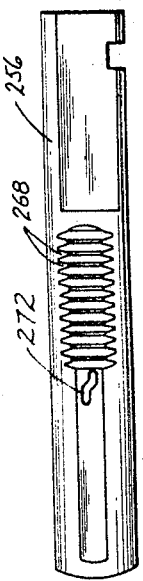

United States Patent Office 3,461,731
Patented Aug. 19, 1969

3,461,731
MECHANISM FOR CONVERTING ROTARY MOTION TO RECIPROCATING AND ROTARY MOTION
Karl R. Lewis, 77 Olney Road,
Wethersfield, Conn. 06109
Original application Dec. 16, 1966, Ser. No. 609,979, now Patent No. 3,377,730, which is a continuation-in-part of application Ser. No. 524,763, Feb. 3, 1966. Divided and this application Apr. 5, 1968, Ser. No. 719,080
Int. Cl. F16h 25/12, 37/16
U.S. Cl. 74—22                                     10 Claims

ABSTRACT OF THE DISCLOSURE

This application discloses a mechanism wherein the rotary motion of one driving member is converted into reciprocating and rotary motion of another driven member. The motion conversion is accomplished by coengaging teeth on the two members constructed and arranged to apply both axial and rotational forces to the driven member, and guide means for restraining the driven member to a desired path of movement including both axially and angularly extending components. The mechanism is specifically disclosed as used in a firearm, the motion converting mechanism being used to convert the rotation of a driving member into reciprocating and rotational movement of the firearm bolt.

Related applications

This application is a division of application Ser. No. 609,979, filed Dec. 16, 1966, now Patent No. 3,377,730, which in turn is a continuation-in-part of application Ser. No. 524,763, filed Feb. 3, 1966, and now abandoned.

Summary and aims of the invention

This invention relates to motion converting mechanisms and deals more particularly with a mechanism for converting rotational movement of one member into reciprocating and rotational movement of another member the reciprocating movement being linear movement along a given axis and the rotational movement being angular movement about the same axis.

The general object of this invention is to provide an extremely simple, reliable and efficient mechanism for driving a given member or element both linearly along a given axis and in rotation about such axis, that is, along or through a given path or program of movement including both axial and rotational components. In keeping with this object, a further object is to provide a mechanism wherein the axial and rotational movement of the driven member or element is produced as the result of the rotation of an associated driving member or element.

Another object of this invention is to provide a motion converting mechanism for converting rotary motion to both reciprocating and rotary motion and which mechanism is particularly useful in a firearm for effecting reciprocating and rotational movement of a bolt.

Other objects and advantages of the invention will be apparent from the following description and from the drawings forming a part hereof.

In the drawings and description, the motion converting mechanism of this invention is shown for convenience as embodied in a firearm and for use in moving the bolt of the illustrated firearm both axially and rotationally. It should be understood, however, that this use is intended to be exemplary only and that the motion converting mechanism illustrated may be used in many other mechanisms and devices wherever it is desired to drive a given part through a given path or program of movement including axial and rotational components.

Brief description of the drawings

FIG. 1 is a fragmentary vertical sectional view taken on a plane passing generally longitudinally through a lever action firearm embodying the present invention, this view showing the bolt in its fully closed position and part of the bolt being shown broken away to reveal the firing pin.

FIG. 2 is a view generally similar to FIG. 1 but showing the parts in the positions occupied when the bolt is in its fully opened position.

FIG. 3 is a view generally similar to FIG. 1 but shows the parts in the positions occupied when the bolt is at the position at which it starts to rotate when moving from its fully opened to its fully closed position.

FIG. 4 is a transverse vertical sectional view taken on the line 4—4 of FIG. 1.

FIG. 5 is an enlarged view of the bolt of the FIG. 1 firearm, this view being taken looking toward the top of the bolt when oriented as in FIG. 2.

FIG. 6 is a side view of the bolt as shown in FIG. 5.

FIG. 7 is a bottom view of the FIG. 5 bolt.

FIG. 8 is a side view of the FIG. 5 bolt and shows the side opposite the one shown in FIG. 6.

FIG. 9 is a forward end view of the FIG. 5 bolt.

FIG. 10 is an enlarged end view of the bolt actuating gear of the FIG. 1 firearm.

FIG. 11 is a side elevational view of the gear of FIG. 10.

FIG. 12 is a development of the gear teeth on the larger diameter portion of the FIG. 10 gear.

FIG. 13 is a front elevational view of the housing of the firearm of FIG. 1, this view being taken generally on the line 13—13 of FIG. 1 with the barrel of the firearm being shown removed from the housing.

FIG. 14 is a fragmentary vertical sectional view taken on a plane passing generally longitudinally through a lever action firearm comprising another embodiment of this invention, this view showing the bolt of the firearm in its fully closed position.

FIG. 15 is generally similar to FIG. 14 but shows the parts of the FIG. 14 firearm in the positions occupied when the bolt is in its fully opened position.

FIG. 16 is an enlarged view of the bolt of FIG. 14 firearm, this view being taken looking toward the top of the bolt when oriented as in FIG. 15.

FIG. 17 is a side view of the FIG. 16 bolt.

FIG. 18 is a bottom view of the FIG. 16 bolt.

FIG. 19 is a side view of the FIG. 16 bolt and shows the side opposite the one shown in FIG. 17.

FIG. 20 is an enlarged end view of the bolt actuating gear of the FIG. 14 firearm.

FIG. 21 is a side elevational view of the FIG. 20 gear.

FIG. 22 is a development of the gear teeth on the larger diameter portion of the FIG. 20 gear, this development being drawn on a scale somewhat smaller than FIG. 20.

FIG. 23 is a vertical sectional view taken on a plane passing generally longitudinally through a firearm comprising still another embodiment of this invention.

FIG. 24 is a top view of the bolt operating lever of the FIG. 23 firearm.

FIG. 25 is a bottom view of the bolt of the FIG. 23 firearm.

Description of the preferred embodiments

Turning now to the drawings, wherein like reference numerals apply to like parts throughout the same and first considering FIGS. 1 to 13, these figures show a lever action rifle, indicated generally at 10 in FIGS. 1, 2 and 3, utilizing a motion converting mechanism embodying the present invention. Except for the bolt operating mechanism and related parts hereinafter described in detail, the firearm 10 is or may be of generally conventional construction. Various parts of the firearm 10 are explained in more detail in copending patent application Ser. No. 609,979, mentioned hereinabove, to which reference may be had for a better understanding of its detailed construction and operation. For the present, however, it may be noted that the firearm 10 comprises basically a housing or frame 12, a barrel 14 threaded into the forward end of the housing, a stock 16 and a forearm 18 fastened to the housing 12 by means of a hanger rod 20. In the upper portion of the housing is an elongated bore or recess 21, concentric with the barrel 14, which receives a reciprocating bolt 22. FIG. 1 shows the bolt 22 in its fully closed position relative to the housing 12 and from this position the bolt may be moved rearwardly to a fully opened position as shown in FIG. 2. A clip 26 is releasably held in place in the housing by a manually operable latch 28. The clip 26 stores a number of cartridges and acts to feed a fresh cartridge upwardly into the bolt recess 21 and into the path of a bolt when a bolt is in its open position. During forward movement of the bolt, the first cartridge is engaged and moved by the bolt forwardly into the firing chamber 25 of the barrel. In FIG. 2, the broken lines at 30 indicate a fresh cartridge moved into the path of the bolt by the clip 26.

Associated with the bolt 22 is an exposed hammer 42. The hammer is pivotally mounted to the housing 12 by a transverse pivot pin 48 for movement between an uncocked position, as shown in FIG. 1, and a cocked position, as shown in FIG. 2. The arrangement of the hammer is such that it is automatically moved from its uncocked to its cocked position as the bolt is moved from its closed to its position. The bolt is biased towards its uncocked position by a spring 50 received in a guide tube 52 in the stock 16. At the forward end of the spring is a guide stem 56 having an enlarged head with a forwardly facing recess which receives the rear end of a strut 58 acting between the spring and the hammer 42. A sear 60, biased by a spring 64 toward the hammer 42, and a trigger 67 cooperable with the sear control the firing of the hammer.

In accordance with the invention, the firearm 10 further includes a simple motion converting mechanism for driving the bolt 22 between its open and closed positions relative to the housing 12. Before turning to a description of this means, however, it should be noted that the bolt 22, in addition to being merely reciprocated longitudinally relative to the housing 12, is also rotated relative to the housing when in or near its forwardmost position in order to effect locking or unlocking of the bolt relative to the housing, the bolt being locked relative to the housing when in its fully closed condition to prevent it from being blown open by the forces developed during the firing of a cartridge. The particular locking means employed may take various different forms and basically comprises means defining one or more rearwardly facing abutment surfaces on the housing and means defining one or more forwardly facing abutment surfaces on the bolt, the forwardly facing surfaces being moved into and out of overlapped angular alignment with the rearwardly facing surfaces by the rotation of the bolt. In the case of the firearm 10, the locking means is shown to comprise two sets of generally helical locking lugs 70, 70 and 72, 72 on the housing extending radially into the forward end portion of the housing bore 21. The lugs 70, 70 comprising one set are longitudinally spaced from one another, are located within a common angular zone, and are generally helical in shape. The locking lugs 72, 72 comprising the second set are similarly longitudinally spaced from one another, are located in a common angular zone, and are generally helical in shape. As shown best in FIG. 13, the two sets of housing lugs are angularly spaced from one another to provide two spaces 71 and 73 of substantial angular extent therebetween.

For cooperation with the locking lugs 70, 70 and 72, 72 of the housing, the bolt 22 includes two mating sets of lugs 74, 74 and 76, 76. At one end of the lugs 74, 74 is a longitudinally extending recess or space 75 and at the similar end of the lugs 76, 76 is another longitudinally extending recess or space 77. As will be evident from FIGS. 5 to 9 and 13, the arrangement of the locking lugs 70, 70 and 72, 72 on the housing and the arrangement of the locking lugs 74, 74 and 76, 76 on the bolt is such that as the bolt is moved from its fully opened position toward its closed position, the lugs on the bolt move past the lugs on the housing until all of the lugs on the bolt are aligned with spaces between the lugs on the housing. That is, the housing lugs 70, 70 move along the bolt recess 75, the housing lugs 72, 72 move along the bolt recess 77, the bolt lugs 74, 74 move along the housing space 71, and the bolt lugs 76, 76 move along the housing space 73. The position of the bolt at which all the housing lugs are aligned with spaces between the bolt lugs is shown in FIG. 3. As the bolt is thereafter rotated from the position shown in FIG. 3, the lugs on the bolt move between the lugs on the housing to hold the bolt against rearward movement during firing. FIG. 1 shows the fully locked or closed position of the bolt. To return the bolt from the fully closed position of FIG. 1 to the fully opened position of FIG. 2, the bolt is first rotated to remove the lugs of the bolt from angular alignment with the lugs of the housing, that is to the position of FIG. 3, and the bolt is then moved rearwardly to the FIG. 2 position. In rotating the bolt from the fully closed position to the FIG. 3 position, the rotative movement is stopped by the engagement of the end faces of the housing lugs 70, 70 with the longitudinally extending side face 83 of the bolt recess 75, one of such lug end faces being shown at 85 in FIG. 13.

Turning now to the bolt operating mechanism of the firearm 10, this mechanism includes a generally cylindrical driving element 78 supported for rotation relative to the housing 12 by a transverse pivot pin 80. The element 78 includes a number of teeth or similar driving elements on its periphery and for convenience is hereinafter refreed to as a gear. The teeth on the gear 78 mesh with teeth or similar driving elements on the bolt 22 so that as the gear is rotated relative to the housing the bolt and the gear operate, at least part of the time, as a rack and pinion to cause the bolt to be reciprocated relative to the housing. The rotation of the gear 78 is in turn effected by a smaller diameter pinion 82 which is or may be integral with and located to one side of the gear 78. The teeth of the pinion 82 in turn mesh with a number of teeth formed on an internal gear segment 84 carried by an upwardly extending portion of a lever 86 pivotally connected to the housing 12 by a transverse pivot pin 88.

All of the teeth of the bolt 22 and of the gear 78 are not, however, exactly similar to the teeth of a simple rack and pinion. Referring with more particularity to FIGS. 6, 7, 8, 10, 11 and 12, which show in detail the shape and arrangement of the teeth, it will be noted that the teeth on the bolt 22 includes a first set of teeth 90, 90 each of which is in the nature of a straight spur gear tooth and is arranged generally perpenedicular to a plane passing through the axis of the bolt. The teeth 90, 90 are formed by, and separated from one another, by grooves 91, 91 having straight root or bottom surfaces 93, 93. Also, the bolt, at the angular location of the teeth, is ground or otherwise machined or formed to include a flat 95 which extends over the length of the bolt occupied by the teeth and provides the teeth 90, 90 with straight top surfaces 97, 97. The set of teeth 90, 90 extends over a major portion of the length of the bolt from a point slightly behind the locking lugs 74, 74 and 76, 76 to a point near the rear end of the bolt. At the rear end of the set of teeth 90, 90, however, are two additional teeth 92, 92 which are inclined relative to the axis of the bolt so as to be generally helical in shape and formed by three similarly inclined or helical grooves 94, 94. These teeth and grooves pass over part of the flat 95 and extend angularly for some distance beyond the flat along one adjacent side of the bolt. The teeth 90, 90 and 92, 92 together form one composite set of teeth on the bolt. The gear 78, as best shown in FIGS. 10, 11 and 12, similarly includes a first set of teeth 96, 96 each of which is in the nature of a straight spur gear tooth and is arranged parallel to the axis of the gear, and which first set of teeth in use mesh with the teeth 90, 90 of the bolt 22. Similar to the bolt teeth 90, 90, the gear teeth 96, 96 include straight top surfaces 99, 99 and are separated by grooves having straight root surfaces 101, 101. Also on the gear 78 and at one end of the set of teeth 96, 96 are three additional teeth 98, 98 which are inclined relative to the axis of the gear 78 so as to be generally helical in shape and which in use mesh with the helical teeth 92, 92 and grooves 94, 94 of the bolt. The teeth 96, 96 and 98, 98 together form one composite set of teeth extending along an angular portion of the periphery of the gear 78, and at one end of this composite set of teeth is a stopping flat 100 and at the other end is a stopping flat 102.

The action of the gear teeth and bolt teeth in moving the bolt between its open and closed positions may be best understood by reference to FIGS. 1, 2 and 3. Starting with the bolt 22 in its fully open position as in FIG. 2, it will be noted that when the bolt is in this position the stopping flat 102 on the gear 78 is engageable with the outer surface of the bolt 22 adjacent the lugs 76, 76 to prevent further counterclockwise rotation of the gear and to thereby prevent further opening movement of the bolt. The stopping flat 102 therefore acts as a means for limiting the rearward or opening movement of the bolt relative to the housing and for also limiting the accompanying opening movement of the lever 86. In this FIG. 2 position of the gear the first gear tooth 96 adjacent the stopping flat 102 also intermeshes with the forwardmost teeth 90, 90 on the bolt. If the gear 78 is now rotated in a clockwise direction, as by moving the lever 86 clockwise toward its closed position, the other teeth 96, 96 on the gear 78 mesh with the other teeth 90, 90 on the bolt and drive the bolt forwardly toward the firing chamber 25. The number of teeth 96, 96 on the gear 78 is equal to the number of teeth 90, 90 on the bolt 22 so that after the gear 78 is rotated to the point shown in FIG. 3 the last tooth 96 on the gear 78 is in engagement with the last tooth 90 on the bolt. Also, the first helical tooth 98 on the gear 78 is aligned with and at least partially received in the first helical groove 94 on the bolt. It should also be noted that at this time the locking lugs on the bolt are aligned with the spaces between the locking lugs on the housing 12 and continued forward travel of the bolt relative to the housing is prevented by the engagement of the rearwardmost housing lug 70 with the surface 79 (see FIG. 5) at the end of the recess 75 and/or by engagement of the rearwardmost housing lug 72 with the surface 81 (see FIG. 6) at the end of the recess 77. Also, during the movement of the bolt between the FIG. 1 and FIG. 3 positions rotation of the bolt relative to the housing is prevented despite the cylindrical shape of the bolt and the housing bore 21. The means for preventing this rotation is provided by the straight top surfaces 97, 97 and 99, 99 and by the straight root surfaces 93, 93 and 101, 101 of the bolt and gear teeth, these surfaces being engageable with one another to prevent rotation of the bolt relative to the gear.

As the gear 78 is moved further in the clockwise direction from the position shown in FIG. 3, the helical teeth 98, 98 on the gear 78 move into more of a meshing relationship with the grooves 94, 94 and teeth 92, 92 of the bolt and a resulting camming and sliding action takes place which causes the bolt 22 to simultaneously rotate and move slightly forwardly in such a manner as to cause the locking lugs of the bolt to move between the locking lugs of the housing until the bolt is moved to the fully closed position of FIG. 1. The grooves defining the helical teeth on the bolt and gear do not have straight bottoms, but instead extend in helical curves about the bolt and gear axes, respectively, to allow the bolt to rotate, and the coaction between the two sets of helical teeth is generally similar to that existing between the teeth of a pair of conventional helical gears used to drivingly connect two perpendicular non-intersecting shafts. Therefore, by a single continuous movement of the gear 78, as obtained by a single continuous pivotal movement of the lever 86, the bolt is reciprocated from its open to its closed position and rotated at its closed position to lock it relative to the housing. On the opeening movement of the bolt the reverse process takes place with the helical teeth 92, 92 of the bolt and the helical teeth 98, 98 of the gear cooperating first to rotate the bolt to an unlocked position and with the other teeth of the bolt and gear thereafter operating to move the bolt to its rearward or open position. As shown in FIG. 1, the stopping flat 100 of the gear 78 is engageable with the outer surface of the bolt 22 to prevent further clockwise rotation of the gear and to thereby limit the closing and locking movement of the bolt. Also, as a result of the movement of the gear 78 by the smaller diameter pinion 82 and the gear segment 84, a mechanical advantage is achieved between the lever 86 and the gear 78 so that a large movement of the gear 78 may be obtained with a much smaller movement of the lever 86. For example, in the illustrated embodiment the mechanical advantage is about 5 to 1 so that the full range of movement of the gear 78 may be obtained with about 60 degrees of movement of the lever 86. It should also be understood that the amount of rotation of the bolt employed in the firearm is somewhat dependent on the amount of locking required between the bolt and the housing and that more or less rotation of the bolt, to obtain more or less overlap of the locking lugs, may be used depending on the size of cartridge used in the firearm.

In further regard to the firearm 10 it should also be noted that the helical shape of the locking lugs in the housing and on the bolt is a convenience in that it allows the lugs in the housing to be easily formed by the use of a tap. The helical shape of the lugs is not, however, essential to the operation of the bolt and driving gear and, if desired, the lugs could be made so as to be straight rather than helical in shape. In this case the bolt would undergo no longitudinal movement while being rotated by the helical bolt and gear teeth.

Turning now to FIGURES 14 to 22, these figures show an alternate form of firearm, indicated generally at 121 in FIGS. 14 and 15, utilizing an alternative form of motion converting mechanism embodying the present invention. The illustrated firearm 121 is identical to the firearm 10 of FIGS. 1 to 13, except for including a different arrangement of teeth on the bolt and on the rotary bolt operating gear. The bolt of the firearm 121 is indicated at 122 and the bolt operating gear at 124. Most other parts of the firearm 121 are identical or similar to the corresponding parts of the firearm 10 and have been given the same reference numerals and need not be redescribed.

Referring to the bolt 122 and gear 124 of the firearm 121, and first considering the bolt 122, this bolt as shown best in FIG. 18 includes a first set of straight teeth 126, 126 which set of teeth extends along a major portion of the length of the bolt from a position just to the rear of the locking lugs to a point near the rear end of the bolt. At the location of the teeth the bolt includes a longitudinally extending flat 125 which provides the teeth 126, 126 with straight and flat top surfaces 127, 127. The teeth 126, 126 are separated from one another by straight bottomed grooves 129, 129 and the grooves and the teeth are inclined relative to the axis of the bolt. At the rear end of the set of teeth 126, 126 is another set of two teeth 128, 128 formed by three inclined grooves 130, 130. The teeth 128, 128 and grooves 130, 130 are inclined relative the axis of the bolt 122 at the same angle as the teeth 126, 126 and grooves 129, 129 and extend in a helical fashion from the bottom of the bolt and for some distance along one side of the bolt. Together the set of teeth 126, 126 and the set of teeth 128, 128 therefore form a composite set of teeth extending a substantial distance along the length of the bolt. In addition to the teeth 126, 126 and 128, 128, the bolt 122 also includes, in its upper surface, a guide slot having a first longitudinally extending portion 134 substantially equal in length to the length of the set of teeth 126, 126 and also having at the rear end of the longitudinally extending portion 134 a generally helically extending portion 136.

The structure of the gear which cooperates with the bolt 122 is best shown in FIGS. 20, 21 and 22. Referring to these figures the gear 124 includes a set of helical teeth 133, 133 extending over the major portion of its periphery. All of the teeth 133, 133 are similar to one another, and at one point along its periphery the gear 124 includes a stopping flat 135. A driving pinion 82 is fixed to the gear 124 at one side thereof and is rotated by a gear segment 84, carried by the lever 86, in response to movement of the lever.

As shown in FIGS. 14 and 15, the teeth on the gear 124 mesh with the teeth on the bolt 122. Also the housing 12 of the firearm includes a guide pin 137 which projects downwardly into the housing bore 21 and into the slot 132 of the bolt. When the bolt is fully open as shown in FIG. 15, the gear teeth 133, 133 mesh with the teeth 126, 126 on the bolt 122 and the housing pin 137 is located in the forward end of the longitudinal portion 134 of the guide slot 132. As the lever 86 is rotated clockwise from the FIG. 15 position, the gear segment 84 on the lever rotates the pinion 82 of the gear 124 to rotate the gear 124 and to drive the bolt forwardly. Since the teeth on the gear 124 and the teeth on the bolt are both inclined, there is some force exerted on the bolts during this motion tending to rotate it relative to the housing. The engagement of the top surfaces of the gear teeth 133, 133 with the straight root surfaces of the bolt teeth 126, 126 could be used to resist this force and to prevent the bolt from rotating. Preferably, however, bolt rotation is prevented by the engagement of the pin 137 with one wall of the slot which causes the bolt to be guided in a straight linear motion. When the teeth on the gear 124 reach the teeth 128, 128 and helically curved grooves 130, 130 on the bolt the guide pin 137 is positioned at the rear end of the longitudinal portion 134 of the guide slot 132. At this time the locking lugs on the bolt are also aligned with the spaces between the locking lugs on the housing and the rearwardmost housing lugs are in engagement with the surfaces 79 and 81 at the rear ends of the bolt recesses 75 and 77 to prevent further purely linear forward motion of the bolt. Thereafter, continued rotation of the gear 124, as a result of a camming action between the gear teeth 133, 133 and the bolt teeth 128, 128, causes the bolt to be rotated with the guide pin 137 moving in the radial portion 136 of the bolt guide slot 132. As this rotation of the bolt takes place, the locking lugs of the bolt move between the locking lugs of the housing to the position shown in FIG. 14 to lock the bolt against rearward movement by the pressures developed during firing. When the bolt reaches the fully closed position of FIG. 14, the stopping flat 135 on the gear 124 engages the outer surface of the bolt to prevent further rotation of the gear and to thereby limit the rotative movement of the bolt.

When the bolt is moved to its fully open position, as shown in FIG. 15, the pinion 82 on the gear 124 engages the forward wall 138 of the gear segment 84, as shown, to limit the opening movement of the bolt and lever 86, the wall 138 having a curvature generally similar to that of the pinion 82 to prevent undue wear on any one point of the pinion. It will, of course, be understood that various other different stopping means, or combinations of stopping means, may be employed to limit the movement of the bolt and lever in both directions without departing from the invention. As an example of an alternative means, the guide pin 137 could be arranged to engage one or both ends of the guide slot 132 to limit the bolt movement in one or both directions. As another example of an alternative stopping means which could be used to limit the closing movement of the bolt, the bolt, as shown by the broken lines of FIG. 17, could also include an inset block 139 providing radial abutment surfaces 140, 140 at the trailing ends of at least some of the bolt lugs 74, 74 which abutment surfaces 140, 140 are engageable by the leading end surfaces 142, 142 (see FIG. 13) of the corresponding housing lugs 70, 70 as the bolt is moved to its fully closed position.

In both the case of the motion converting mechanism utilized in the firearm 10 of FIGS. 1 to 13 and in the case of the motion converting mechanism used in the firearm 121 of FIGS. 14 to 22, the bolt or driven member is, in response to rotation of the driving gear, along one position of its path moved in a purely axial fashion and along another portion of its path moved with a combination of both rotational and axial movement. In other environments, however, it will be obvious that different paths or programs of movement may be followed. For example, the driven part could be made to move through several different axial path segments connected by other segments consisting purely of rotational movement or of combined rotational and axial movement. Also, the path could include no purely axial segments, but instead be made up of various segments having various different combinations of axial and rotational movement. The driven part could also be made to rotate first in one direction and then in the other direction as it is moved axially. In fact, almost any desired path or program of movement, made up of axial and rotational components, may be utilized by proper design and shape of the coengaging teeth and the guide means for the driven member.

Also, where only a relatively small amount of rotational movement of the driven member is required a slot and pin arrangement between the driving and driven members, as shown in FIGS. 23, 24 and 25 may be used. In this case, the pin and slot form essentially the equivalent of one pair of coengaging teeth.

FIGS. 23, 24 and 25 show a still further embodiment of the invention as utilized in another firearm 254 which is in many respects similar to the firearm 10 of FIGS. 1 to 13. Referring more closely to FIGS. 23, 24 and 25, the firearm 254 includes a bolt 256 which is operated by a gear segment 258 integral with a manually operable lever 260 connected to the housing 262 of the firearm by a transverse pivot pin 264. Except for having the gear segment 258 connected therewith in place of an internal gear segment such as shown at 84 in FIG. 1, the lever 260 is generally similar to the lever 86 of the firearm 10 of FIG. 1 and the trigger and other parts of the firing mechanism similar to corresponding parts of the firearm 10 have been given the same reference numerals as in FIG. 1. The bolt 256 of the firearm 254 is generally similar to the bolt 220 of the firearm 218 of copending application Serial No. 609,979 and includes a set of angularly spaced locking lugs 248, 248 which cooperate with a corresponding set of angularly spaced locking lugs, one of which is shown at 246, on the housing 262 to lock the bolt in its forward position, the bolt being rotated without any further forward movement to effect an interlocking of the lugs after it is reciprocated from its fully open to its fully closed position.

For reciprocating and rotating the bolt 256 relative to the housing 262, the gear segment 258 carried by the lever 260 includes a set of teeth 266, 266 which are arranged perpendicular to the axis of the bolt 256 and which cooperate with a corresponding set of teeth 268, 268 formed on the bolt. The gear teeth 266, 266 and the bolt teeth 268, 268 are, however, used only to achieve reciprocation of the bolt between its open and closed positions relative to the housing. To obtain a rotation of the bolt after it reaches its closed position, the gear 258 includes a radially extending pin 270 located slightly beyond its last tooth 266. Cooperating with the pin 270, the bolt 256 includes a slot 272 located slightly beyond its last tooth 268. The shape and location of the slot 272 relative to the pin 270 is such that as the last tooth 266 of the gear segment 258 leaves the last tooth 268 of the bolt the pin 270 enters the slot 272. Continued movement of the gear 258 in the clockwise direction, as viewed in FIG. 23, thereafter moves the pin 270 forward in the slot 272 and the shape of the slot 272 is such that the bolt is rotated the proper amount as a result of a camming action between the pin and the slot.

Although the drawings show several embodiments of the invention which have been described, it will be understood that various changes may be made from the constructions disclosed, and that the drawings and description are not to be construed as defining or limiting the scope of the invention, the following claims forming a part of this specification being relied upon for that purpose.

I claim:
1. A mechanism for converting rotary motion to both linear and rotary motion, said mechanism comprising: a supporting structure having an elongated recess, a driven member received in said recess and supported by said supporting structure for reciprocating movement relative thereto along the axis of said recess between first and second axial positions and for angular movement about said axis between first and second angular positions, said driven member having a first set of teeth thereon extending along a portion of its length and consisting of spur teeth arranged generally crosswise to said recess axis, said driven member also having a second set of teeth thereon located adjacent to one end of said first set of teeth and consisting of teeth generally helically inclined relative to said recess axis, a gear supported for rotation relative to said supporting structure about an axis extending generally transversely of said elongated recess, said gear having a first set of teeth thereon which mesh with said first set of teeth on said drive member to move said driven member between said first and second axial positions and a second set of helically inclined teeth which mesh with said second set of helically inclined teeth on said driven member to rotate said driven member between said first and second angular positions in response to rotation of said gear relative to said supporting structure, said first set of teeth on said gear being spur teeth which are so shaped that when in engagement with said spur teeth on said driven member they prevent rotation of said driven member relative to said supporting structure as said driven member is moved between said first and second axial positions, and guide means between said supporting structure and said driven member for restricting said driven member to a predetermined path of movement relative to said supporting structure while said second set of teeth on said driven member is in engagement with said second set of teeth on said gear.

2. A mechanism as defined in claim 1 further characterized by said supporting structure including means defining at a surface extending radially inwardly of said recess and generally angularly about said recess axis, said driven member also including means defining a surface extending radially outwardly and generally angularly about said recess axis and movable into angularly overlapping relationship with said surface of said supporting structure as a result of angular movement of said driven member about said recess axis, said two surfaces serving as part of said guide means.

3. A mechanism as defined in claim 1 further characterized by said supporting structure including at least one lug extending radially inwardly of said recess, and said driven member having at least one lug thereon which is cooperable with said lug of said supporting structure and which driven member lug is moved from an angularly non-overlapped relationship with said supporting structure lug to an angularly overlapped relationship with said supporting structure lug as said driven member is moved from said first to said second angular position, said guide means including said lugs on said supporting structure and a guide recess on said driven member externally generally parallel to said axis of said elongated recess, said lug on said supporting structure being so positioned as to be received in said guide recess as said driven member is moved from its first to its second axial position, said guide means being further characterized by a radial surface on said driven member located at one end of said guide recess and arranged generally perpendicular to said recess axis, and said lug on said supporting structure having a radial surface arranged generally perpendicular to said recess axis and engageable with said radial surface on said driven member to limit reciprocation of said driven member in one direction and to guide said driven member as further rotation of said gear moves said lugs into angularly overlapped relationship.

4. A mechanism for converting rotary motion to both linear and rotary motion, said mechanism comprising: a supporting structure having an elongated recess, a driven member received in said recess and supported by said supporting structure for reciprocating movement relative thereto along the axis of said recess and for angular movement about said axis, said driven member having a plurality of teeth thereon extending along a portion of its length and inclined relative to said recess axis, a gear supported for rotation relative to said supporting structure about an axis extending generally transversely of said elongated recess, said gear having a plurality of inclined teeth thereon which mesh with said inclined teeth on said driven member to move said driven member both along and about said recess axis, and guide means between said supporting structure and said driven member for restraining said driven member to a predetermined path of movement relative to said supporting structure.

5. A mechanism as defined in claim 4 further characterized by said guide means including a guide groove in one of the parts of the set of parts consisting of said supporting structure and said driven member, and a projection fixed to the other part of said set of parts and received in said guide groove, said guide groove extending both axially and angularly of said recess axis.

6. A mechanism as defined in claim 4 further characterized by said supporting structure including at least one lug extending radially inwardly of said recess, and said driven member having at least one lug thereon which is cooperable with said lug of said supporting structure and which driven member lug is moved from an angularly non-overlapped to an angularly overlapped relationship with said supporting structure lug as said driven member is moved from a first angular position to a second angular position, said guide means including a guide groove in said driven member and a projection fixed to said supporting structure and received in said guide groove throughout at least a part of said path of movement, said guide means also including said lugs on said supporting structure and on said driven member.

7. A mechanism for converting rotary motion to both linear and rotary motion, said mechanism comprising: a supporting structure having an elongated recess and including at least one lug extending radially inwardly of said recess, a driven member received in said recess and supported by said supporting structure for reciprocating movement relative thereto along the axis of said recess between first and second axial positions and for angular movement about said axis between first and second angular positions, said driven member having at least one lug thereon which is cooperable with said lug of said supporting structure and which driven member lug is moved from an angularly nonoverlapped relationship to an angularly overlapped relationship with said supporting structure lug as said driven member is moved from said first to said second angular position, said driven member having a first set of teeth thereon extending along a portion of its length and consisting of teeth inclined relative to said recess axis, said driven member also having a second set of teeth thereon located adjacent to one end of said first set of teeth and the teeth of which second set are similarly inclined relative to said recess axis, a gear supported for rotation relative to said supporting structure about an axis extending generally transversely of said elongated recess, said gear having a first set of inclined teeth thereon which mesh with said first set of teeth on said driven member to move said driven member between said first and second axial positions and a second set of inclined teeth thereon which mesh with said second set of inclined teeth on said driven member to move said driven member between said first and second angular positions in response to rotation of said gear relative to said supporting structure, guide means between said supporting structure and said driven member for restraining said driven member to a predetermined path of movement relative to said supporting structure as said driven member is reciprocated between said first and second axial positions by said first set of inclined teeth on said gear and said first set of inclined teeth on said driven member, said guide means including a guide groove in said driven member and a projection fixed to said supporting structure and received in said guide groove throughout at least a part of said path of movement, guide means between said supporting structure and said driven member for restricting said driven member to a predetermined path of movement relative to said supporting structure while said second set of inclined teeth on said driven member are in engagement with said second set of inclined teeth on said gear, said latter guide means including said lugs on said supporting structure and on said driven member and a guide recess on said driven member extending generally parallel to said axis of said elongated recess, said lug on said supporting structure being so positioned as to be received in said guide recess as said driven member is moved to its second axial position, said latter guide means being further characterized by a radial surface on said driven member located at one end of said guide recess and arranged generally perpendicular to said recess axis and said lug on said supporting structure having a radial surface generally perpendicular to said recess axis and engageable with said radial surface on said driven member to limit reciprocation of said driven member in one direction and to guide said driven member as further rotation of said gear moves said lugs into angularly overlapped relationship.

8. A mechanism for converting rotary motion to both linear and rotary motion, said mechanism comprising: a supporting structure having an elongated recess, a driven member received in said recess and supported by said supporting structure for reciprocating movement relative thereto along the axis of said recess between first and second axial positions and for angular movement about said axis between first and second angular positions, said driven member having a set of teeth thereon extending along a portion of its length and consisting of spur teeth arranged generally crosswise to said recess axis, a gear supported for rotation relative to said supporting structure about an axis extending generally transversely of said elongated recess, said gear having a set of teeth thereon which mesh with said set of teeth on said driven member to move said driven member between said first and second axial positions, said set of teeth on said gear being spur teeth which are so shaped that when in engagement with said spur teeth on said driven member they prevent rotation of said driven member relative to said supporting structure as said driven member is moved between said first and second axial positions, coengageable means on said gear and on said driven member for moving said driven member between said two angular positions in response to further rotation of said gear after said driven member is moved from said first to said second axial position, and guide means between said supporting structure and said driven member for restricting said driven member to a predetermined path of movement relative to said supporting structure as said driven member is moved between said two angular positions by said co-engageable means.

9. A mechanism as defined in claim 8 further characterized by said co-engageable means on said gear and on said driven member for moving said driven member between said two angular positions in response to further rotation of said gear after said driven member is moved from said first to said second axial position comprising a projection fixed to one of said latter two parts, and a slot in the other of said latter two parts, said projection and said slot being so arranged that said projection is moved into said slot as said driven member reaches said second axial position during movement of said driven member from said first to said second axial position, said slot having such a shape that as said projection is moved therealong as a result of said further rotation of said gear said projection engages one wall of said slot and cams said driven member angularly relative to said supporting structure.

10. A mechanism as defined in claim 8 further characterized by said supporting structure including at least one lug extending radially inwardly of said recess and said driven member having at least one lug thereon which is cooperable with said lug of said supporting structure and which driven member lug is moved from an angularly non-overlapped relationship with said supporting structure lug to an angularly overlapped relationship with said supporting structure lug as said driven member is moved from said first to said second angular position, said guide means including said lugs on said supporting structure and on said driven member and a guide recess on said driven member extending generally parallel to said axis of said elongated recess, said lug on said supporting structure being so positioned as to be received in said guide recess as said driven member moves from its first to its second axial position, said guide means being further characterized by a radial surface on said driven member located at one end of said guide recess and arranged at an angle to said recess axis and said locking lug on said supporting structure having a radial surface arranged at an angle to said recess axis and engageable with said radial surface on said driven member to limit reciprocation of said driven member in one direction and to guide said driven member as further rotation of said gear moves said lugs into angularly overlapped relationship.

References Cited

UNITED STATES PATENTS

| 86,971 | 2/1869 | Conklin | 42—16.4 |
| 1,520,515 | 12/1924 | Storer | 42—16.15 |
| 2,476,154 | 7/1949 | Lohs | 74—29 |

FRED C. MATTERN, JR., Primary Examiner

W. S. RATLIFF, JR., Assistant Examiner

U.S. Cl. X.R.

42—16.1

PO-1050
(5/69)

UNITED STATES PATENT OFFICE
CERTIFICATE OF CORRECTION

Patent No. 3,461,731    Dated August 19, 1969

Inventor(s)  Karl R. Lewis

It is certified that error appears in the above-identified patent and that said Letters Patent are hereby corrected as shown below:

Col. 3, line 37, after "its" insert --open--.
Col. 4, line 44, "refrered" should read --referred--.
Col. 6, line 16, "opeening" should read --opening--.
Col. 9, line 46, "drive" should read --driven--.
Col. 10, line 12, "externally" should read --extending--.

SIGNED AND
SEALED
APR 14 1970

(SEAL)
Attest:

Edward M. Fletcher, Jr.
Attesting Officer

WILLIAM E. SCHUYLER, JR.
Commissioner of Patents